US008972518B2

(12) United States Patent
Hecht et al.

(10) Patent No.: US 8,972,518 B2
(45) Date of Patent: Mar. 3, 2015

(54) INTEGRATED DATA-MODEL AND FLOW BASED POLICY SYSTEM

(75) Inventors: Jacob Hecht, Kfar-Hess (IL); Danny Kalish, Ra'anana (IL); Zvika Diamant, Gimzo (IL)

(73) Assignee: Flash Networks Ltd., Herzeliya (IL)

( * ) Notice: Subject to any disclaimer, the term of this patent is extended or adjusted under 35 U.S.C. 154(b) by 602 days.

(21) Appl. No.: 11/858,177

(22) Filed: Sep. 20, 2007

(65) Prior Publication Data

US 2009/0083408 A1 Mar. 26, 2009

(51) Int. Cl.
*G06F 15/16* (2006.01)
*G06Q 10/10* (2012.01)

(52) U.S. Cl.
CPC .................................... *G06Q 10/10* (2013.01)
USPC ........... 709/217; 709/203; 709/219; 709/223; 709/224

(58) Field of Classification Search
USPC .......... 709/223, 203, 217, 219, 224; 700/103, 700/109; 705/1.1, 7.27; 717/100, 124
See application file for complete search history.

(56) References Cited

U.S. PATENT DOCUMENTS

| 6,308,163 | B1* | 10/2001 | Du et al. ............................ 705/8 |
| 7,308,702 | B1* | 12/2007 | Thomsen et al. .................. 726/1 |
| 7,350,226 | B2* | 3/2008 | Moriconi et al. ................. 726/1 |
| 7,363,650 | B2* | 4/2008 | Moriconi et al. ................. 726/1 |
| 7,395,151 | B2* | 7/2008 | O'Neill et al. ................. 701/209 |
| 7,673,323 | B1* | 3/2010 | Moriconi ........................ 726/1 |
| 2004/0006403 | A1* | 1/2004 | Bognanno ..................... 700/109 |
| 2004/0117333 | A1* | 6/2004 | Voudouris et al. .............. 706/13 |
| 2004/0230681 | A1* | 11/2004 | Strassner et al. ............. 709/226 |
| 2006/0070025 | A1* | 3/2006 | Mauceri et al. ................ 717/106 |
| 2006/0225064 | A1* | 10/2006 | Lee et al. ....................... 717/168 |
| 2006/0235964 | A1* | 10/2006 | Childress et al. ............. 709/224 |
| 2006/0236061 | A1* | 10/2006 | Koclanes ....................... 711/170 |
| 2007/0268922 | A1* | 11/2007 | Dougan et al. ................ 370/401 |
| 2008/0256593 | A1* | 10/2008 | Vinberg et al. ................... 726/1 |

\* cited by examiner

*Primary Examiner* — Jimmy H Tran
(74) *Attorney, Agent, or Firm* — Fleit Gibbons Gutman Bongini & Bianco PL; Martin Fleit; Paul D. Bianco

(57) ABSTRACT

Disclosed is a system for managing policies related to services offered to customers of network and service providers. The system enables operators and service providers to efficiently manage and define generic policies on top of their services via a code-free centralized interface. The infrastructure solution enables the operators, subscribers and application providers to define and enforce their service policies for each application, such as access control, charging schemes, privacy, campaign promotions, cross-selling and up-selling and mobile advertising, from one central point on top of all services and resources. Once integrated, no additional programming is required to create new policies or modify existing policies. The disclosed system enables operators to easily view and manage the data related to their business entities, such as services, handsets, subscribers and the like, and define the associated policies. The system allows defining policies on any type of service, traffic type or policy domain.

23 Claims, 2 Drawing Sheets

INTEGRATED DATA-MODEL AND FLOW BASED POLICY SYSTEM

FIELD OF THE INVENTION

The present invention relates to systems and methods which enable providing advance services to customers of service providers such as mobile or fixed network providers; more specifically, it relates to systems and methods for centrally managing and applying service and business policies on the services and customers of the service provider.

BACKGROUND

Policy management and evaluation systems are used to delegate pieces of business and decision logic from other systems and control them in a central and flexible way. Systems such as enforcement point or application servers invoke the policy server in order to request a decision or in order to allow it to carry out additional actions. Enforcement points can be any system which invokes the policy system by sending an event to it or calling it via an API. Examples can be: proxies, gateways, routers, Deep packet Inspection (DPI) systems or application servers.

The following are few examples of policy logic and systems:

Content access control and filtering—In this use-case a hypertext transfer protocol (HTTP) proxy is intercepting users' requests to mobile or internet web sites. The HTTP proxy, functioning as the policy enforcement point, calls the policy system (Policy Decision Point) using some policy invocation protocol such as Internet Content Adaptation Protocol (ICAP). The HTTP proxy can call the policy decision point on some or all of the HTTP requests and HTTP responses. Based on all information available to it such as information on the requested web site, subscriber, used device, time of day and the like, the policy decision point makes its decision and applies the policy such as block the user, warn the user or request further identification such as personal identification number (PIN) code.

Showing advertisements for a discounted price—In this use-case, a user is consuming some premium service such as download of premium content or initiating a premium session. According to the applied business logic advertisements are added to the service while subscribers are compensated by receiving a discount on the service standard price. To apply this logic the enforcement point can be the download application which delivers the content to the user or a proxy such as a Session Initiation Protocol (SIP) proxy which is involved in the initiation of the premium session. The enforcement point calls the policy system when the premium content or session is requested. The policy server makes a decision whether to add and advertisement, which one and what benefits to entitle the subscriber for it. In addition, it can invoke other modules or systems to actually add the proper advertisement into the requested service. All decisions and actions are based on information such as the nature of the requested service or content, the type and identity of the subscribers, whether they opted in to the ad-sponsored service and the like. There is therefore a need for an advanced policy system which can evaluate policy logic based on flows, where the policy logic is represented as a structured sequence of decisions and actions in a similar way to a flowchart. The policy language should include all constructs applicable in programming, scripting or modeling languages including branches, loops and the like. The policy system should enable users to define and configure the policies. Additionally, the policy system should include a run-time component where the policy server is called by the enforcement point and evaluates and applies the policies as defined in the design phase. The flow and data components should be coupled to allow high level of user-friendliness in the policy design phase and of efficiency in the run-time phase.

BRIEF DESCRIPTION OF THE DRAWINGS

The subject matter regarded as the invention will become more clearly understood in light of the ensuing description of embodiments herein, given by way of example and for purposes of illustrative discussion of the present invention only, with reference to the accompanying drawings, wherein.

Figure 1:
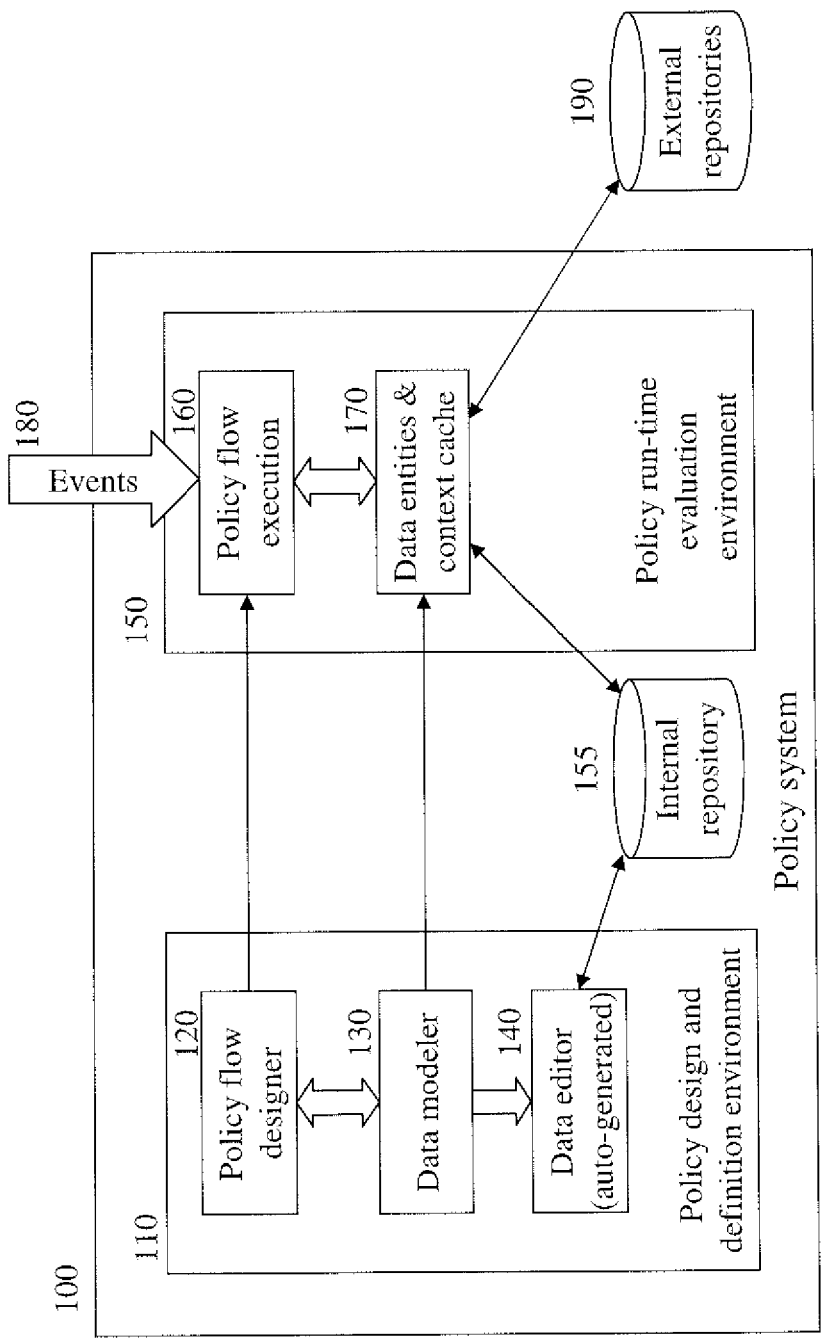
FIG. 1 is an illustration of a block diagram of the principal components in accordance with embodiments of the present invention.

The drawings together with the description make apparent to those skilled in the art how the invention may be embodied in practice.

No attempt is made to show structural details of the invention in more detail than is necessary for a fundamental understanding of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF SOME EMBODIMENTS OF THE INVENTION

The present invention is a system for managing policies related to services offered to customers of network providers. The system enables operators and service providers to efficiently manage and define generic policies on top of their services via a code-free centralized interface. By providing an infrastructure solution, the system enables the operators, subscribers and application providers to define and enforce their service policies for each application, such as access control, charging schemes, privacy, campaign promotions, cross-selling and up-selling and mobile advertising, from one central point on top of all services and resources. Using open data integration and process integration, the on-going maintenance is reduced, and control abilities are at the hands of business and marketing people. Once integrated, no additional programming is required to create new policies or modify existing policies. The disclosed system enables operators to easily view and manage the data related to their business entities, such as services, handsets, subscribers and the like, and define the associated policies. The system allows defining policies on any type of service, traffic type or policy domain such as: charging and advertising for browsing services handled by third party service providers or provisioning of device configurations to the operators subscribers.

This patent refers to an advanced policy system which evaluates policy logic based on flows. The policy logic is represented as a structured sequence of decisions and actions in a similar way to a flowchart. The policy language may include all constructs applicable in programming, scripting or modeling languages including branches, loops etc. The policy system includes a data model which describes the data entities used in the policy evaluation and execution process and which defines where the data has to be retrieved from and in what way it should be cached by the policy evaluation engine. The policy system includes a design and definitions phase where the policies are defined and configured and a run-time phase where the policy server is called by the enforcement point and evaluates and applies the policies as defined in the design phase. The flow and data components are coupled to allow high level of user-friendliness in the policy design phase and of efficiency in the run-time phase.

An embodiment is an example or implementation of the inventions. The various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiments, but not necessarily all embodiments, of the inventions. It is understood that the phraseology and terminology employed herein is not to be construed as limiting and are for descriptive purpose only.

The principles and uses of the teachings of the present invention may be better understood with reference to the accompanying description, figures and examples. It is to be understood that the details set forth herein do not construe a limitation to an application of the invention. Furthermore, it is to be understood that the invention can be carried out or practiced in various ways and that the invention can be implemented in embodiments other than the ones outlined in the description below.

It is to be understood that the terms "including", "comprising", "consisting" and grammatical variants thereof do not preclude the addition of one or more components, features, steps, or integers or groups thereof and that the terms are to be construed as specifying components, features, steps or integers. The phrase "consisting essentially of", and grammatical variants thereof, when used herein is not to be construed as excluding additional components, steps, features, integers or groups thereof but rather that the additional features, integers, steps, components or groups thereof do not materially alter the basic and novel characteristics of the claimed composition, device or method.

If the specification or claims refer to "an additional" element, that does not preclude there being more than one of the additional element. It is to be understood that where the claims or specification refer to "a" or "lan" element, such reference is not be construed that there is only one of that element. It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof selected steps or tasks. The term "method" refers to manners, means, techniques and procedures for accomplishing a given task including, but not limited to, those manners, means, techniques and procedures either known to, or readily developed from known manners, means, techniques and procedures by practitioners of the art to which the invention belongs. The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. The present invention can be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

FIG. 1 is a block diagram illustrating the principal components of embodiments of the present invention and their relationship. The proposed policy system 100 performs policy evaluations on events sent to it from external systems 180, which are referred to as policy enforcement points in this context. Policy logic and actions are executed using flow engine 160 according to the policy flow definition done in design environment 110, specifically, in flow designer 120. The policy flow is a flowchart-like representation of the decisions and actions that are executed during policy evaluation. For example, the policy logic can include the following condition: call a system to classify the content of the consumed service. If the subscriber segment equals X and the service category equals Y, than block the service, otherwise allow access to it. The flow language can vary and be based on standards like Business Process Execution Language (BPEL), Unified Modeling Language (UML) or any other standard or proprietary language.

In the process of evaluating and executing the policy logic, run-time system 150 uses a rich set of context information. The term context information refers to all information which can be accessible and relevant at any specific event disregarding where it is held or how it is obtained. Policy system 100 may retrieve the context information from the internal database of the system 155 or from external data repositories 190 using a variety of protocols, such as Structured Query Language (SQL), Lightweight Directory Access Protocol (LDAP), Web Services and the like. In addition, the context information includes data which is generated by the flow engine and stored only in its memory. This can include input parameters to the flow or local flow variables. Entities which are part of the context are defined in the data modeling phase in data modeler 130. For example, if the policies apply content based access control based on service categorization and user profile, data model 130 would contain an entity type for service and an entity type for subscriber. The service entity type would include the service categorization property and the subscriber may contain the segment property and the preferred policy property.

For working on it, the policy server may hold the context information in memory in its context cache 170. The context data held in the memory is completely defined by the data modeler component 130. For example, it may be defined that the subscriber properties are retrieved from an external repository using LDAP and that a specific property may be cached for 2 minutes.

All accessible entities are automatically exposed to flow run-time engine 130 and to flow designer 120 so the policy creator can use any data entity type or data instance in his or her flows. In order to configure the policies the system user uses the data forms 140 that are automatically generated from the data model, and that allow setting values to any entity in the internal database of the policy server. For example, assuming the properties of the subscribers can be defined within policy system 100, and not fetched from an external system, a form would be generated from the data model allowing the user of the system to set the properties of a specific subscriber.

Figure 2:
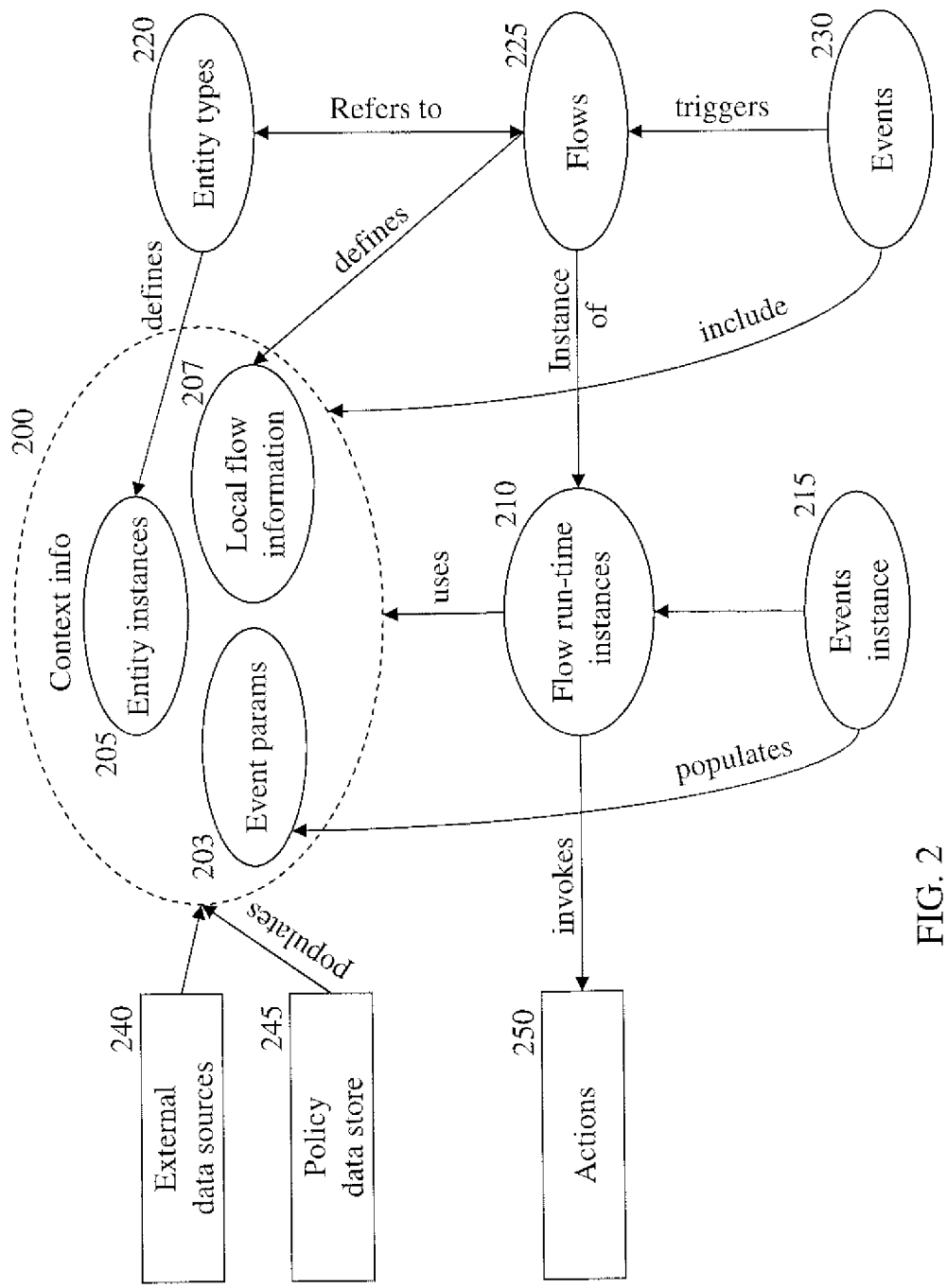
FIG. 2 is a schematic illustration of the logical relation between the different objects of the system in accordance with embodiments of the present invention.

FIG. 2 illustrates the relations between the objects in the policy systems in accordance With embodiments of the present invention. Events 230 represent inputs that trigger the policy flow evaluation. Each event 230 includes a subset of the context 200 which is applicable when this event occurs. Event 230 triggers a specific flow 207 that handles the policies associated with this event, possibly by invoking other flows. In run-time a particular flow instance 210 handles the instance of this event.

Flows 225 contain the definition of the business and policy flow logic. Flows 225 can refer to data entity instances 205 or local flow information 207 according to their entity types 220. The proposed policy system 100 helps and validates the use of data entities based on their definition, for instance, at a particular point, the flow can use only properties of entities which represent integers or represent an access control profile entity. Context information 200 is populated by information arriving within a specific event 203, data defined in the entity types 205 and fetched either from the internal data store of the system 245, from external data stores 240, or from local information defined and populated by the flows local variables 207. In run-time the flow instance 210 can access the context information 200 in an optimized way since information in the context information 200 is cached and fetched as needed and defined in the entity types definitions 220.

Policy system 100 is invoked by events 180 from external systems which are integrated with it using any protocol such as: HTTP, Simple Object Access Protocol (SOAP), SIP, ICAP, Go Text Protocol (GTP) or Diameter. These events 180 logically represent consultation with policy system 100 or a notification to it, so that policy logic can be applied.

The policies invoked by the events are defined using flowcharts (flows 225) visually edited using a code-free drag-and-drop graphic user interlace (GUI). According to embodiments of the present invention, the operator databases and network capabilities (enablers) are represented in the GUI of the system, so they can be used in flows 225 in order to create and enforce complex and powerful policies.

During the policy design stage the system user is creating or editing flows 225 that represent the policy logic. A flow 225 is defined as an ordered set of actions and directives structuring the steps to be taken in order to accomplish a given task. Flows 225 are activated directly by the system or from other flows 225, in order to accomplish the task. A flow 225 can be regarded as a function of any programming language—it includes decisions and actions and its behavior may be governed by parameters or data from the context of its operation.

According to embodiments of the present invention, the user of the system has free hand in defining flows 225. However, based on its integrated policy management capabilities, the system is able to provide some guidelines for the creation of flows 225 in order to ease the creation, extension and maintenance of flows. Through the flow language, flows 225 may be layered. By layering the flows 225 some of the system-level policies are dictated and enforced by a small number of common flows; the service-specific policies may then be composed as simple flows 225 and do not have to relate to the system-level policies. Thus, according to an embodiment of the present invention, a set of system flows may be maintained by the system administrator, while the rest of the flows are managed by other users. The term system flows is a purely logical definition and is not enforced or defined in the system at all.

The integrated policy system 100 includes a data model which is used to describe the data entities on which policies operate. The data model describes the entity types, their constituent properties and the relations between them. For example, a service entity type may include the service name, service description, service provider and price. The service provider property is a reference to the service provider entity. Each of the properties has multiple attributes that describe its data type, such as number, string or Boolean, description, on-line help text etc. The properties may be organized on a hierarchical grouping which facilitates both their presentation in the editing GUI, such as tabs or window panes, and their use in the flow editor. Properties may also include attributes related to their presentation in the entity editor GUI. For instance, a Boolean can be displayed as a check box or as a radio button. Especially important to this invention, is the ability to provide attributes related to the run-time meaning and use of the properties. This can include the property run-time embodiment and business meaning. For example, the run-time implementation can be whether the property is mapped to a field in the database of the policy manager or if the property is mapped to an external repository from which it should be fetched. Alternatively, the property is only mapped to the memory of the system and is created when a certain session starts in the policy server and is deleted when the session ends. The session can represent a continuity of activity of a certain external entity, such as a subscriber, a certain period of time or the time between some start and end events.

The data model also describes the business aware context caching capabilities. This allows the run-time engine to cache the values of each property based on the current policy activity. For example, if a property may change at any point in time and this has business meaning for the implemented policies, like a monetary balance of a subscriber, the property is marked as "fetch whenever used". In this case, the run-time engine will fetch the value from its defined data source whenever the policy flow accesses it in run-time. Another example is of a property that can be used for the duration of the session even if it is changed by an external system.

The relation between the data model and the policy flows manifests itself in two ways. First, in design time relations, where the data model is known to the flow editor. Second, in run-time relations, where the data model is use by the flow execution engine to access data in an optimized way, cache it in memory and dispose it.

The design time integration between the flow designer and the data editor allows all entity types to be shown as usable types in the flow editor and their properties readily accessible with their organizational hierarchy and data types. The data manipulation operations are also automatically created in the flow editor for creating, deleting and retrieving all entity types. These actions use the properties of the relevant entity type as inputs. Additionally, specific entity instances can be used when a value of their respective type is required. These entity instances are fetched from the internal repository of policy system. For example, if special policy logic has to be applied for a specific service, the flow may refer to this service entity by its name, or by any identifying unique property, and compare it to the currently handled service. The run-time integration between the flow engine and the run-time data model based context management component allows fetching the data required by the policy flow from the correct data source: the internal database, an external data source or from the memory. It also enables fetching data at optimal times in order to minimize accesses to costly resources such as the database or external systems. For example, a full set of properties of an entity can be retrieved from the external system at once even if only one of these properties is currently required by the flow engine. This affinity is defined in the data model. Additionally, it allows caching any fetched data in the policy flow engine session for efficient access, and removing the data from the cache based on the model definition as to the allowed validity time of the data.

The data model can be used to automatically generate data entry forms. These forms are used to create, populate, edit and delete data entity instances that are later used by the policy flow. Entities are used in the policy flow runtime by retrieving them from the database of the system. They can also be used at design time by using them as literals, e.g. for comparing a property of an event to a known entity. For instance, one can test if the Uniform Resource Locator (URL) passed from an HTTP proxy in an ICAP message is identical to the URL of a known special service as defined in the database of the system using the generated forms. Also, it is possible to refer to specific flows from the generated forms in order to refer to specific policies that have to be applied or used in the context of an entity instance. For example, if for a specific service defined in the data editor it is required to apply a specific policy—this policy flow can be selected from the form used to edit the properties of the specific service.

While the invention has been described with respect to a limited number of embodiments, these should not be construed as limitations on the scope of the invention, but rather as exemplifications of some of the embodiments. Those skilled in the art will envision other possible variations, modifications, and applications that are also within the scope of the invention. Accordingly, the scope of the invention should not be limited by what has thus far been described, but by the appended claims and their legal equivalents. Therefore, it is to be understood that alternatives, modifications, and variations of the present invention are to be construed as being within the scope and spirit of the appended claims.

What is claimed is:

1. A policy management system for handling requests within data communication and service networks, wherein said handling includes identifying and evaluating request and activating and enforcing flow based or rule based scenarios, in relations to internal and real-time external events, said system comprises a policy server comprising:
   a data model stored on memory for defining data objects structure, relations and values, wherein said definition includes: data objects properties, relations of said data objects to other data objects, data sources of said data objects and access policies of said data objects;
   a flow design and execution engine executed by a processor for defining policy logic including, conditions and flow of actions and applying said policy logic on said real-time external events received during the execution of the flow, wherein the flow design is an ordered set of actions and directives structuring the steps to be taken in order to accomplish a given task, wherein at least one of flow action operation is invoked in run-time by triggering of said real-time external events received from external data repositories located at remote location, through data communication network, wherein an real-time external event represents consultation with policy management system, so that policy logic is applied, and wherein information of the real-time external event includes a result of consultation between values that were defined in the data sources and data from external systems; a context management module providing relevant context information based on said data model to said flows according to its current state and context, wherein the context is related to the event which triggered the corresponding action,
   wherein Each event includes a subset of the context which is applicable when this event occurs
wherein at least one of the data model, the flow design and execution engine, and the context management is implemented by at least one computer.

2. The system of claim 1, further including a management user interface for inserting and editing the data of data entities in said data model.

3. The system of claim 2 wherein said data is stored in a persistent data store.

4. The system of claim 3 wherein said persistent data store is at least one of the following: a relational database, a Lightweight Directory Access Protocol (LDAP) repository.

5. The system of claim 1 wherein the context information defined by said model is stored in system memory.

6. The system of claim 5 wherein said context information is shared by at least one of the following: all the system, single server and user's session.

7. The system of claim 1 wherein the context information defined by said model is stored for each flow, wherein the flow is an ordered set of actions and directives structuring the steps to be taken in order to accomplish a given task.

8. The system of claim 1 wherein the context information defined by said model is stored in at least one of the following: the persistent store of the system, an external persistent data store.

9. The system of claim 1 wherein the context information defined by said model is cached by the system.

10. The system of claim 1 further including an end-user user interface for defining policies that use the data model elements.

11. The system of claim 1, wherein entity types of said data model are types in the policy flow language.

12. The system of claim 11, wherein said entity types include their properties and referenced entities.

13. The system of claim 11, further comprising assignment statements that manipulate the data entities directly.

14. The system of claim 13, wherein said manipulation is performed in at least one of the following: in the internal memory of said system; in the internal database of the system or in an external database.

15. The system of claim 1 wherein data entities of said data model are literals in the policy flow language.

16. A policy management method for handling requests within data communication and service networks, wherein said handling includes identifying and evaluating request and activating and enforcing flow based or rule based scenarios, in relations to internal and real-time external events, said method comprising the steps of:
   defining data objects structure, relations and values through a data model, wherein said definition includes at least one of the following: data objects properties, relations of said data objects to other data objects, data sources of said data objects and access policies of said data objects;

defining policy logic including conditions and actions of flows through a flow design and execution engine, wherein the policy logic definition include logic relation between action of flows and internal/real-time external events;

applying said policy logic on processing incoming requests according to defined conditions and action of flows wherein the flow design is an ordered set of actions and directives structuring the steps to be taken in order to accomplish a given task, wherein the action flow operation is invoked in run-time, by triggering real-time external events, received from external data repositories located at remote location during the execution of the flow, through a data communication network, wherein real-time external event represents consultation with policy management system, so that policy logic is applied, and wherein information of the real-time external event includes data result of consultation between values that were defined in the data sources and data from external systems;

providing relevant context information from said data model to said flows through a context management module according to its current state and context, wherein the context is related to the event which triggered the corresponding action, wherein said policy logic enables plurality of operators and service providers to define their business rules through the flow design and execution engine different policies on any type of services, traffic type or policy domain, and wherein at least one of the defining data object types, defining policy logic engine, applying said policy logic, providing relevant context information is performed by at least one computer.

17. The method of claim 16 further including the step of inserting and editing the data of data entities in said data model through a management user interface.

18. The method of claim 16, wherein entity types of said data model are types in the policy flow language.

19. The method of claim 18, wherein said entity types include their properties and referenced entities.

20. The method of claim 16, wherein data entities of said data model are literals in the policy flow language.

21. The method of claim 16, wherein the context information is shared by at least one of the following: all the system, single server, user session.

22. The method of claim 16 wherein the context information defined by said model is cached by the system.

23. The method of claim 16, further comprising the step of manipulating the data objects directly by assignment statements.

\* \* \* \* \*